(12) United States Patent
Katzman et al.

(10) Patent No.: US 7,039,060 B2
(45) Date of Patent: May 2, 2006

(54) SYSTEM AND METHOD FOR EXTRACTING FIELDS FROM PACKETS HAVING FIELDS SPREAD OVER MORE THAN ONE REGISTER

(76) Inventors: Sol Katzman, 207 Temple Rd., Waltham, MA (US) 02452; Robert Gelinas, 12 Oakland Ave., Needham, MA (US) 02492; W. Patrick Hays, 20 Garfield St., Cambridge, MA (US) 02138

( * ) Notice: Subject to any disclaimer, the term of this patent is extended or adjusted under 35 U.S.C. 154(b) by 826 days.

(21) Appl. No.: 09/799,610

(22) Filed: Mar. 7, 2001

(65) Prior Publication Data

US 2002/0126663 A1 Sep. 12, 2002

(51) Int. Cl.
*H04L 12/28* (2006.01)

(52) U.S. Cl. .............................. 370/428; 370/412

(58) Field of Classification Search ................ 370/389, 370/412, 428, 429; 712/300, 25, 221
See application file for complete search history.

(56) References Cited

U.S. PATENT DOCUMENTS 6,032,190 A * 2/2000 Bremer et al. .............. 709/238
2001/0020266 A1* 9/2001 Kojima et al. .............. 712/225

\* cited by examiner

*Primary Examiner*—Ricky Q. Ngo
*Assistant Examiner*—Derrick W. Ferris (57) ABSTRACT

Systems and methods that allow for extracting a field from data stored in a pair of registers using two instructions. A first instruction extracts any part of the field from a first register designated as a first source register, and executes a second instruction extracting any part of the field from a second general register designated as a second source register. The second instruction inserts any extracted field parts in a result register.

39 Claims, 8 Drawing Sheets

FIG. 1

| 200 | 201 | 202 | 203 | | 204 |
|---|---|---|---|---|---|
| OPCODE FOR EXTIV (6 BITS) | rS1-SOURCE OF WIDTH AND OFFSET DATA (5 BITS) | rT1-SOURCE OF LOW ORDER WORD (5 BITS) | rD1-TEMPORARY REGISTER (5 BITS) | 0 (5 BITS) | SUB-OPCODE FOR EXTIV (6 BITS) |

FIG. 2A

| 210 | 211 | 212 | 213 | | 214 |
|---|---|---|---|---|---|
| OPCODE FOR INSV (6 BITS) | rS2-BACKGROUND DATA REGISTER (5 BITS) | rT2-SOURCE OF HIGH ORDER WORD (5 BITS) | rD2-RESULT REGISTER (5 BITS) | 0 (5 BITS) | SUB-OPCODE FOR INSV (6 BITS) |

# SYSTEM AND METHOD FOR EXTRACTING FIELDS FROM PACKETS HAVING FIELDS SPREAD OVER MORE THAN ONE REGISTER

I. BACKGROUND OF THE INVENTION

This invention relates generally to the field of network communication processors, and more specifically to the field of extracting bit fields from a packet.

Network communication systems demand fast performance. The performance of conventional processors in network communication systems is degraded by slow accessing of bit fields in received packets.

Figure 1:
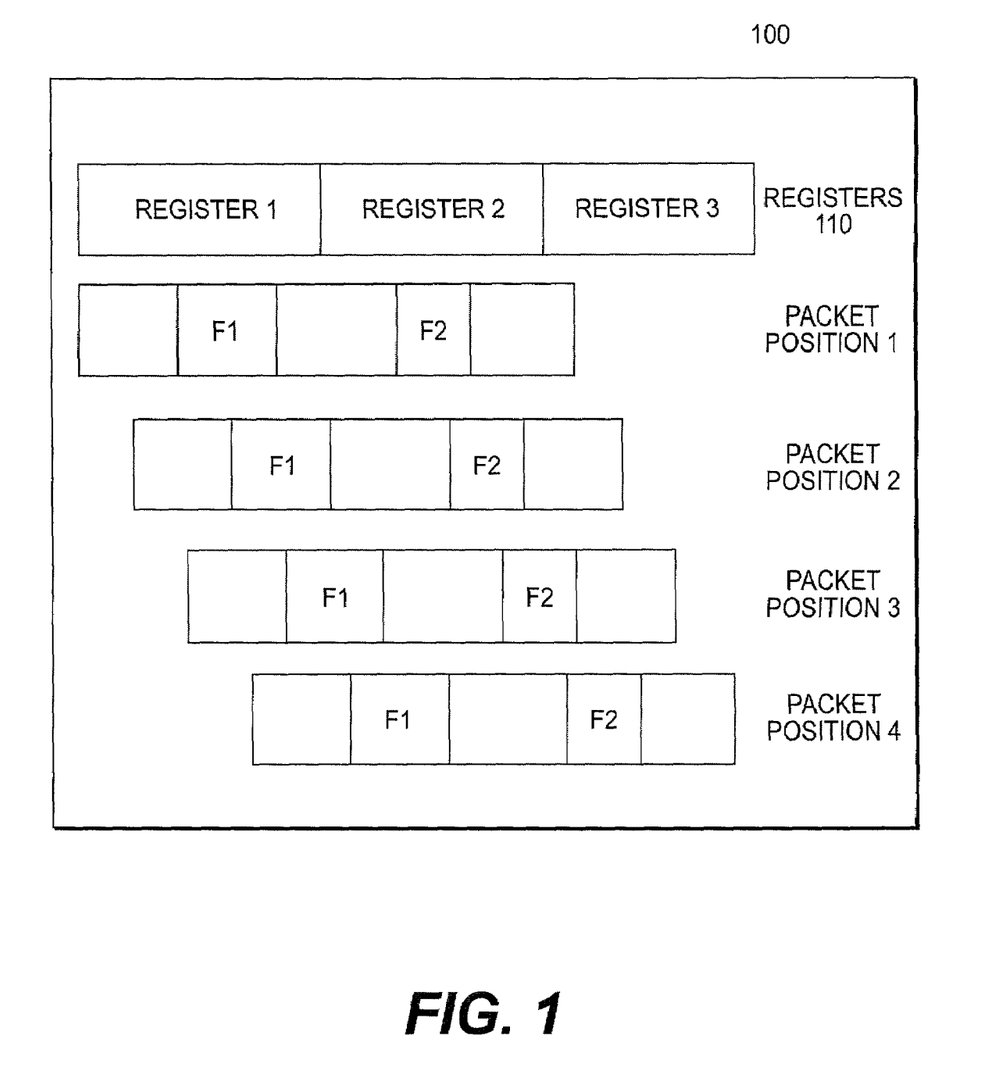
FIG. 1 is a diagram showing potential storage positions of a packet in a set of registers.

When a packet is received at a network processor it is stored in registers. The stored packets are not always aligned the same way in the registers. A stored packet may be stored over one or more registers and be offset. Conventional systems have a plurality of code paths written to handle the different possibilities of packet positioning within registers. For example, FIG. 1 shows different package storage possibilities 100. In this example, a combination of three registers 110 may store a packet having fields F1 and F2 in 4 different ways. Conventional systems have four code paths for extracting bit fields F1 and F2 based on the packet position determined during runtime. After determining a packet's storage position, conventional systems use the corresponding code path to perform a combination of shift and/or operations that shift a field into a desired position, mask the remaining non-field bits and store the field in a result register.

Therefore, it would be desirable to have a single set of instructions that may be used, regardless of the bit field's positioning in the registers to extract the bit field from the packet and insert in a result register.

II. SUMMARY OF THE INVENTION

Systems and methods consistent with the present invention extract fields from a packet using a pair of instructions.

A processing system for extracting a field from a packet consistent with the present invention includes an instruction memory having a pair of instructions, a processor having a set of general registers and temporary registers, a portion of the packet being stored in a pair of general registers. The processor is configured to extract, responsive to a first instruction, any part of the field in a first general register designated as a first source register. The processor is further configured to extract, responsive to a second instruction, any part of the field in a second general register designated as a second source register.

A method for extracting a field from a packet consistent with the present invention stores a portion of the packet in a pair of general registers, executes a first instruction extracting any part of the field from a first general register designated as a first source register, and executes a second instruction extracting any part of the field from a second general register designated as a second source register.

III. BRIEF DESCRIPTION OF THE DRAWINGS

The accompanying drawings, which are incorporated in and constitute a part of this specification, illustrate one embodiment of the invention and, together with the description, serve to explain the objects, advantages, and principles of the invention. In the drawings.

IV. DETAILED DESCRIPTION OF THE PREFERRED EMBODIMENTS

Reference will now be made in detail to embodiments consistent with this invention that are illustrated in the accompanying drawings. The same reference numbers in different drawings generally refer to the same or like parts.

Current processing systems for network communications require a plurality of code paths to extract bit fields from a packet stored across a plurality of registers. Systems and methods consistent with the present invention provide a pair of instructions that may be used, regardless of the packet's position in registers, to extract and insert a field from the packet into a result register. Systems consistent with this invention can extract a field from data stored in a pair of words. For example, referring to FIG. 1, the system may extract field F1 from a pair of registers 1 and 2. F1 may be stored completely in register 1, completely in register 2 or partially in both registers. The present invention executes a pair of instructions, extract (EXTIV) and extract-insert (INSV), to extract the field from the pair of registers and insert into a final result register. The EXTIV instruction extracts any portion of field F1 in register 2 and places the extracted portion in a temporary holding register. The INSV instruction extracts any portion of field F1 in register 1 and places the extracted portion in a temporary result register. INSV merges the portion of F1 in the temporary result register with any portion of F1 in the temporary holding register and stores the entire field F1 in a final result register.

One example application of the systems and methods consistent with the present invention is the formation of a key used for a table lookup operation. In order to look up data in a table lookup unit, a processor sends an operation with data to the table lookup unit (TLU). The operation commands the TLU to look up data in a table using a key. This key is typically comprised of a number of unaligned fields in packet data. To form a key for accessing the TLU, the fields need to be extracted and then inserted in a result register in a specific order.

Figure 2A:
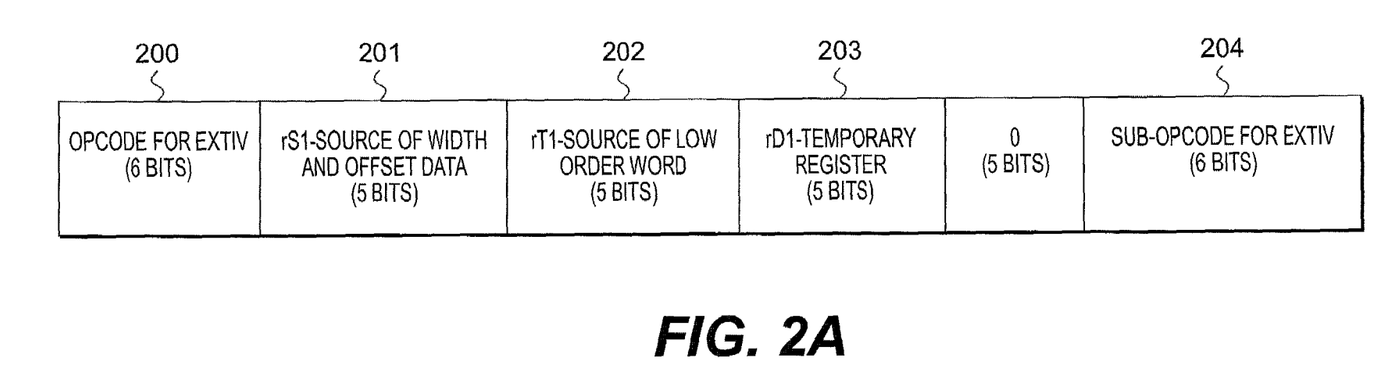
FIG. 2a shows the fields of an EXTIV instruction consistent with methods and systems of the present invention.
Figure 2B:
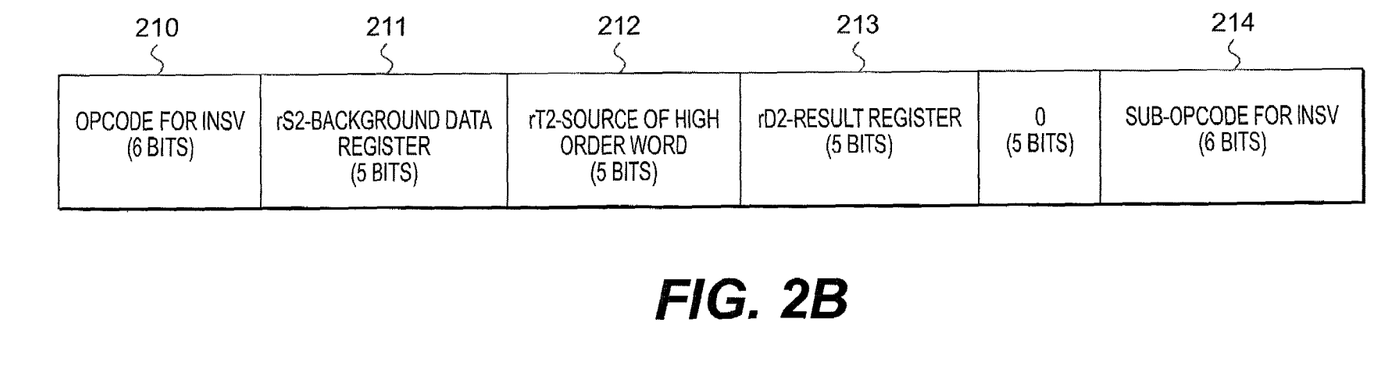
FIG. 2b shows the fields of an INSV instruction consistent with methods and systems of the present invention.

FIGS. 2a and 2b show the format of the pair of instructions consistent with the systems and methods of the present invention. FIG. 2a shows the format for EXTIV, which includes: 1) an opcode for EXTIV 200; 2) $rS_1$ 201 for designating a register that holds a width and offset data for the field of interest; 3) $rT_1$ 202 for designating a register that holds a low order word source; 4) rD$_1$ 203 designating a result register for storing an extracted field; 5) and a sub-opcode field for EXTIV 204.

An INSV instruction is executed following an EXTIV instruction to ensure that a complete field is extracted and stored in a result register. FIG. 2b shows the format for an INSV instruction. The INSV instruction includes: 1) an opcode for INSV 210; 2) rS$_2$ 211 designating a background data register; 3) rT$_2$ 212 designating a register that holds a high order word source; 4) rD$_2$ 213 designating a result register; and 5) a sub-opcode for INSV 214.

Figure 3:
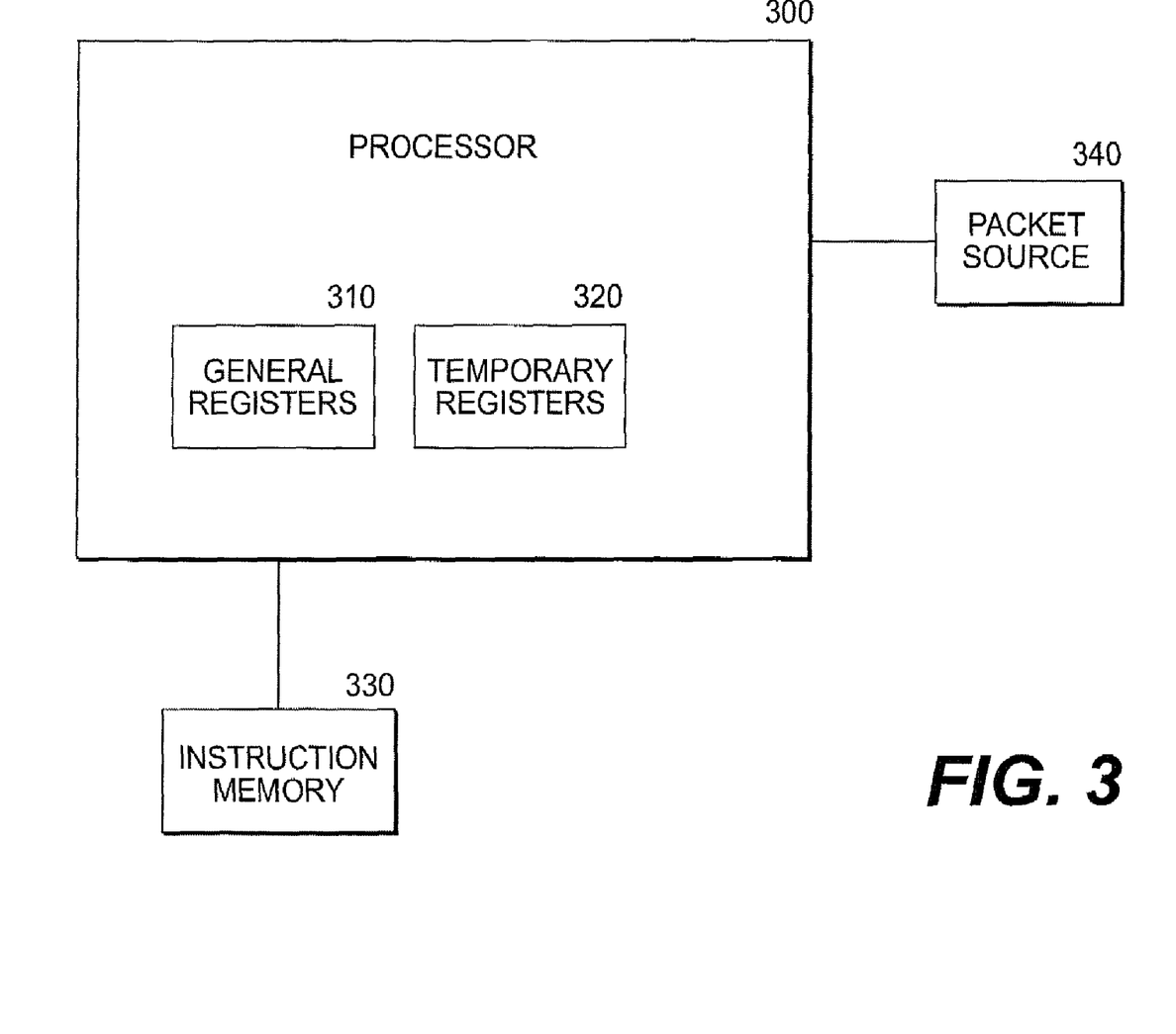
FIG. 3 is a block diagram of a processing system consistent with methods and systems of the present invention.

FIG. 3 shows an exemplary processing system that may be used in systems and methods consistent with the present invention. Processor 300 is preferably a reduced instruction set computer (RISC) processor that may include, among other elements, those in Lexra's LX4180 processor. Processor 300 includes general registers 310 and temporary registers 320. Processor 300 couples to packet source 340 and instruction memory 330. Processor 300 processes instructions in instruction memory 330 such as the EXTIV and INSV instructions. Instruction memory 330 may be, for example, a cache, RAM or DRAM. Packet source 340 may have stored packets, or be an external source of packets for processing instructions in instruction memory 330.

Figure 4A:
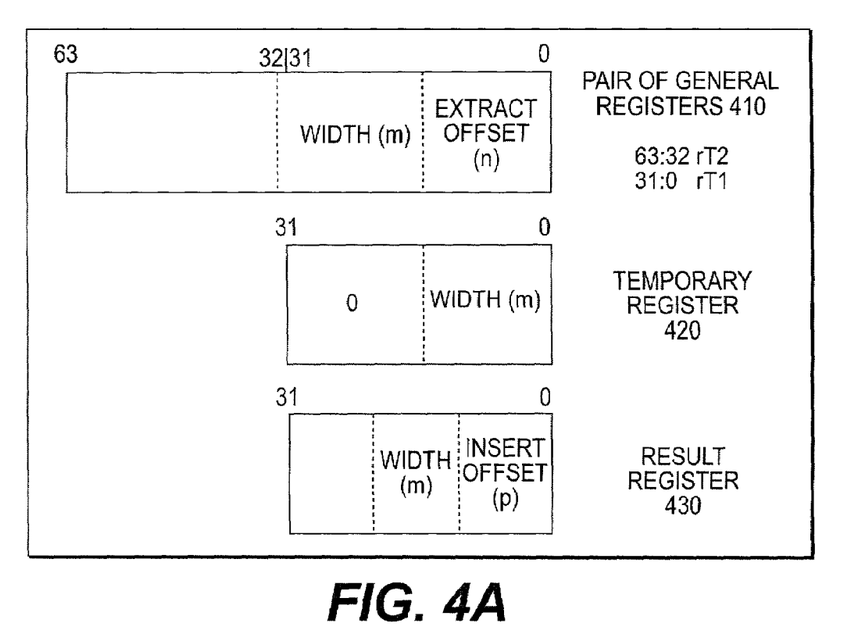
FIGS. 4a–4c show packet data and contents of a temporary and result register using three different data field placements consistent with methods and systems of the present invention.
Figure 4B:
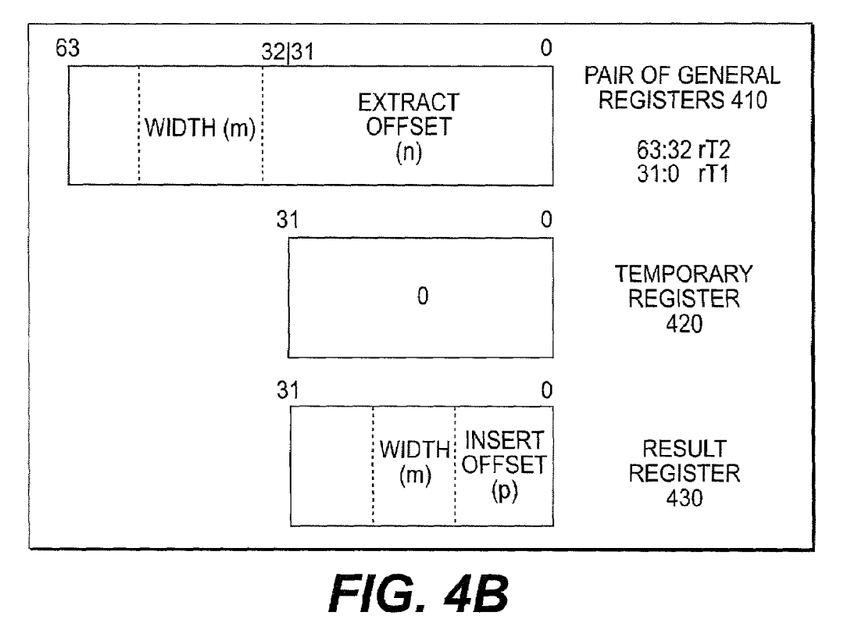
Figure 4C:
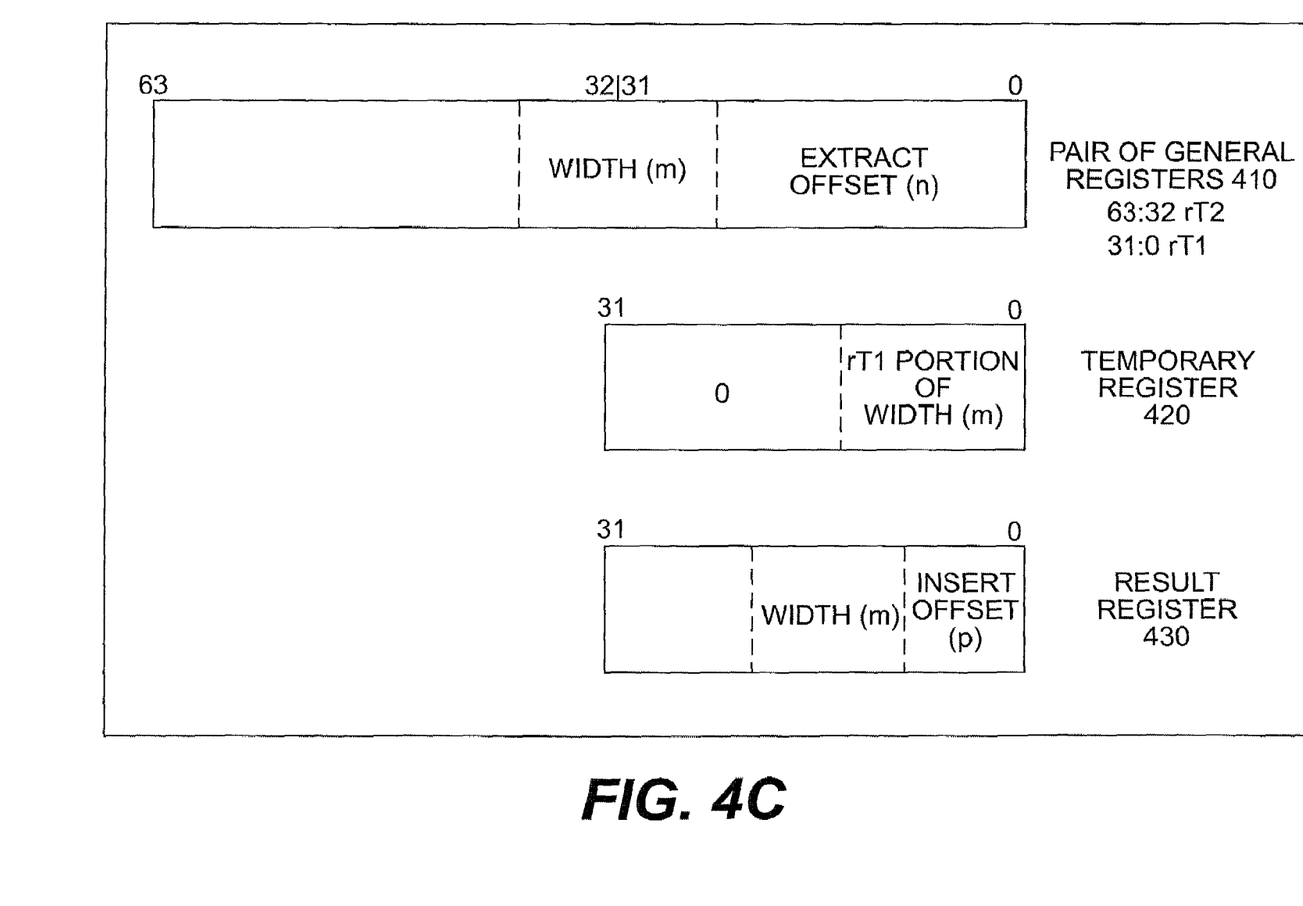

FIGS. 4a–4c show example register contents consistent with the present invention. In each of FIGS. 4a–4c, the field of interest is shown having width (m) and is offset in a pair of general registers rT$_1$ and rT$_2$ by an extract offset (n).

FIG. 4a shows the content of a pair of general registers 410, a temporary register 420, and a result register 430 where the field of interest is held entirely in a low order word in register rT$_1$. In this example, the EXTIV instruction extracts all of the field from register rT$_1$ and stores the result in temporary register 420. The INSV instruction copies the field from the temporary register 420 to the result register 430 offset by insert offset (p).

FIG. 4b shows the content of a pair of general registers 410, a temporary register 420, and a result register 420 where the field of interest is held entirely in register rT$_2$. In this example, the EXTIV instruction does not need to extract any of the field because no portion of the field is in register rT$_1$. Therefore, the EXTIV instruction does not copy any data into the temporary register 420. The INSV instruction copies the field from register rT$_2$ and stores the result in result register 430 offset by insert offset (p).

FIG. 4c shows the content of a pair of general registers 410, a temporary register 420, and a result register 430 where a portion of the field of interest is held in both registers rT$_1$ and rT$_2$. In this example, the EXTIV instruction extracts a first part of the field from register rT$_1$ and stores the result in temporary register 420. The INSV instruction extracts a second part of the field from register rT$_2$ and stores the result, along with the part of the field in the temporary register 420, in the result register 430 offset by insert offset (p).

Figure 5:
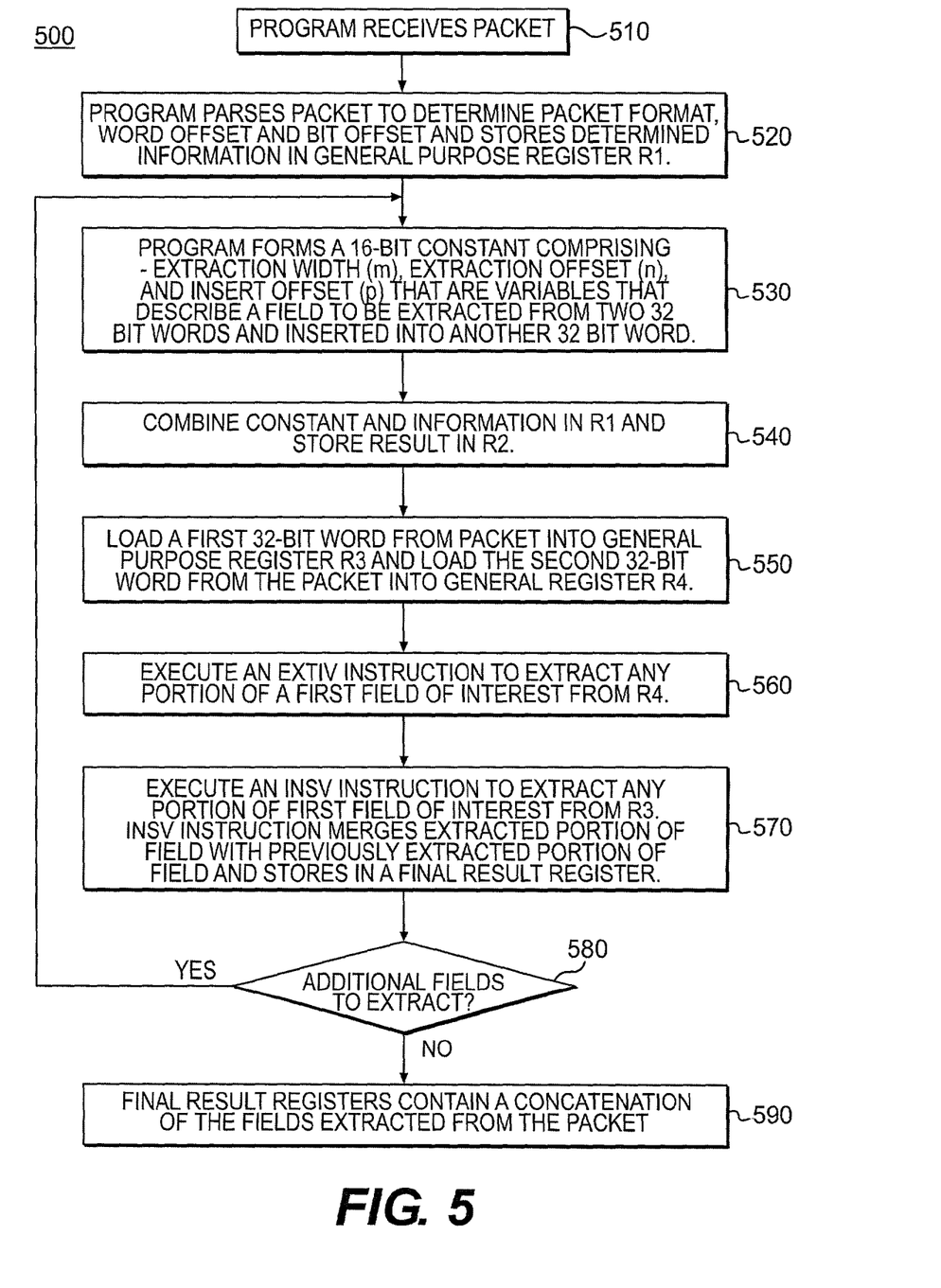
FIG. 5 is flowchart showing the steps for extracting data from packet data consistent with methods and systems of the present invention.

FIG. 5 show the steps 500 for processing a packet in accordance with the present invention. A program running on processor 300 receives a packet from packet source 340 (step 510). The program parses the received packet to determine a packet format, word offset and bit offset and stores the determined information in a general purpose register R1 (step 520). A packet format is a pre-defined format of fields having set locations in the packet of a known size. The packet is stored at a known byte address in memory. A location of the fields of interest within the packet may be identified by a word and bit offset from the known byte address generally referred to here as the extraction offset. Based on the packet format, the executing program can determine information about fields in the packet including a width of the fields, an extraction offset, and an insert offset. The insert offset is the position the field is to be inserted in the result register.

To allow extraction of a particular field from the pair of registers holding at least a portion of the packet, the program forms a constant using the extraction width (m), extraction offset (n), and insert offset (p) for the field (step 530). This constant is combined with the packet information in R1 and stored in another general purpose register R2 (step 540). The program loads a first 32-bit word from the packet into a general purpose register R3 and loads the second 32-bit word of the packet into a general register R4 (step 550).

A field of interest in the packet may be in any of the positions shown in FIGS. 4a–4c. In order to extract the field, the program executes a EXTIV instruction followed by an INSV instruction. In this example, the EXTIV instruction in FIG. 2a designates R2 as the source for field width and offset data 201, R4 as the source for the low order word 202, and a general register Ro as the temporary result register 203. The EXTIV instruction extracts any portion of the field of interest from R4 and stores the result in an implied temporary register and in R0 (step 560). The m, n, and p values for this field in R2 are copied to another temporary register 320 for use by the INSV instruction. The steps for performing an EXTIV instruction are shown in FIG. 6 and discussed below.

After performing an EXTIV instruction, the program must execute an INSV instruction to extract any portion of the field in the upper order word in register R3. Using this example, the INSV instruction in FIG. 2b would designate R3 as the source of the high order word 212 and R5 as the final result register 213. The INSV instruction merges the portion of the field extracted from the high order word with the portion of the field extracted from the low order word and stores the result in a final result register R5 (step 570). Subsequent passes may use register R6, R7 . . . as space in R5 is exhausted. The steps for performing an INSV instruction are shown in FIG. 7 discussed below.

If the program requires the extraction of additional fields (step 580), then steps 530–570 are repeated for each additional field. Once all fields of interest have been extracted, the result registers R5, R6, . . . contain a concatenation of the fields extracted from the packet (step 590).

Figure 6:
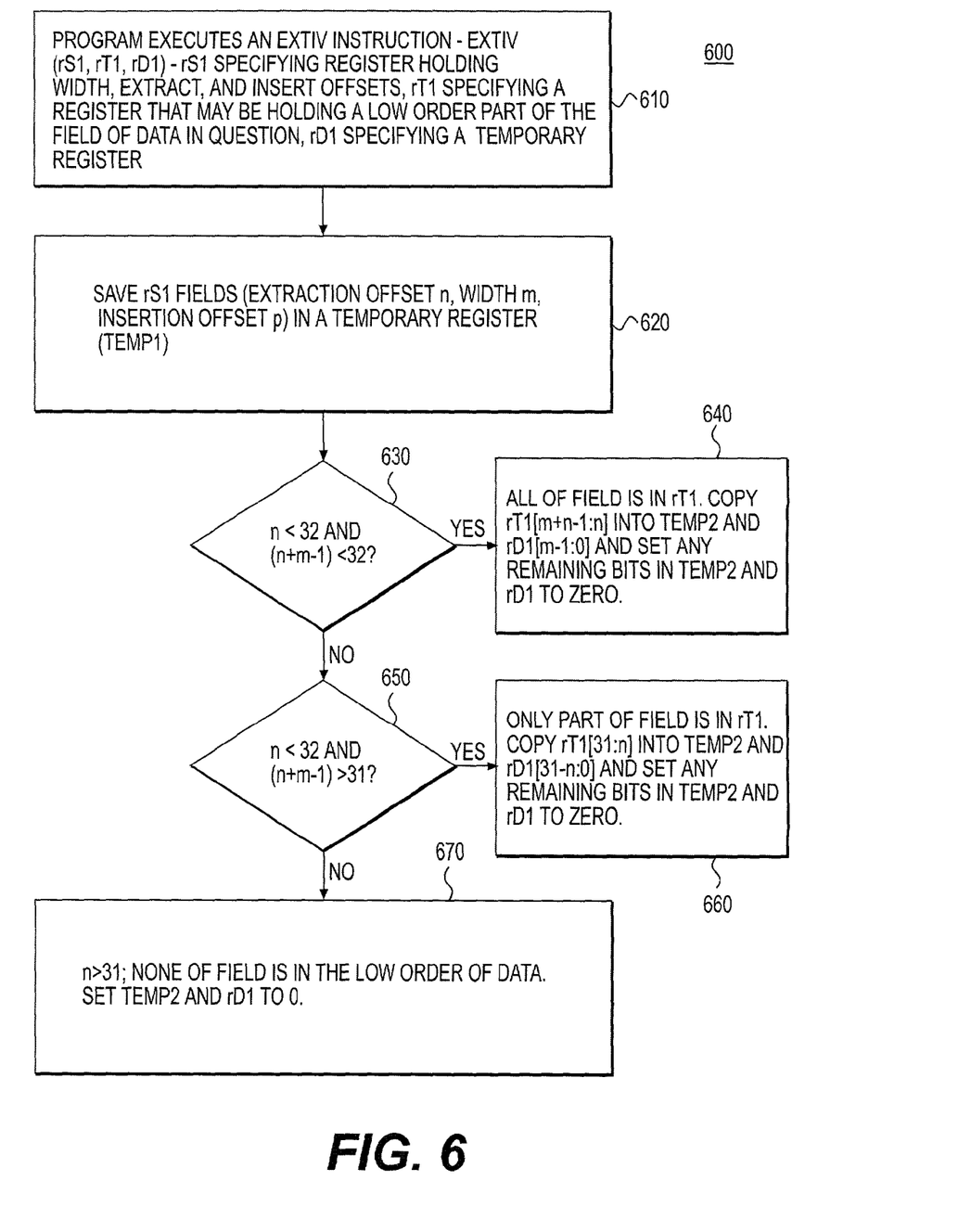
FIG. 6 is a flowchart showing the steps of a method for processing an EXTIV instruction consistent with methods and systems of the present invention.

FIG. 6 shows the steps of an exemplary method 600 for performing an EXTIV instruction. In method 600, instruction memory 330 has instructions that may be included, for example, in a program. The program executes the EXTIV instruction as shown in FIG. 2a (step 610). The processor copies information about the field to be extracted including its width m, extraction offset n, and insertion offset p, from the register designated by rS$_1$ 201 into one of the temporary registers 320 (temp1) (step 620). The extraction offset is the number of bits or bytes that the field of interest is displaced in the pair of words from which the field is to be extracted. For this example, register size is 32 bits. If the extraction offset is less than the register size, 32 bits, and the sum of the width of the field and the extraction offset minus 1 is less than 32 bits (step 630), then the entire field is within the low order word referred to by rT$_1$ 202 in EXTIV. The entire field is copied from the register referred to by rT$_1$ 202 into a temporary register 320 (temp2) and into the register referred to by rD$_1$ 203 and the remaining bits in temp2 and the register referred to by rD$_1$ 203 are set to zero (step 640). If the extraction offset is less than 32 bits and the sum of the width of the field and the extraction offset minus 1 is greater than 31 bits (step 650), then part of the field is in the low order word in the register designated by $rT_1$ 202 and the remaining part of the field is in the high order word for extraction by the INSV instruction. In this case, the EXTIV instruction copies the part of the field in the register referred to by $rT_1$ 202 into temp2 and into the register referred to by $rD_1$ and any remaining bits in temp2 and the register referred to by $rD_1$ are set to zero (step 660). Finally, if the extraction offset is greater than 31, then none of the field is in the low order word of data and temp2 and the register referred to by $rD_1$ 203 are set to zero (step 670).

Figure 7:
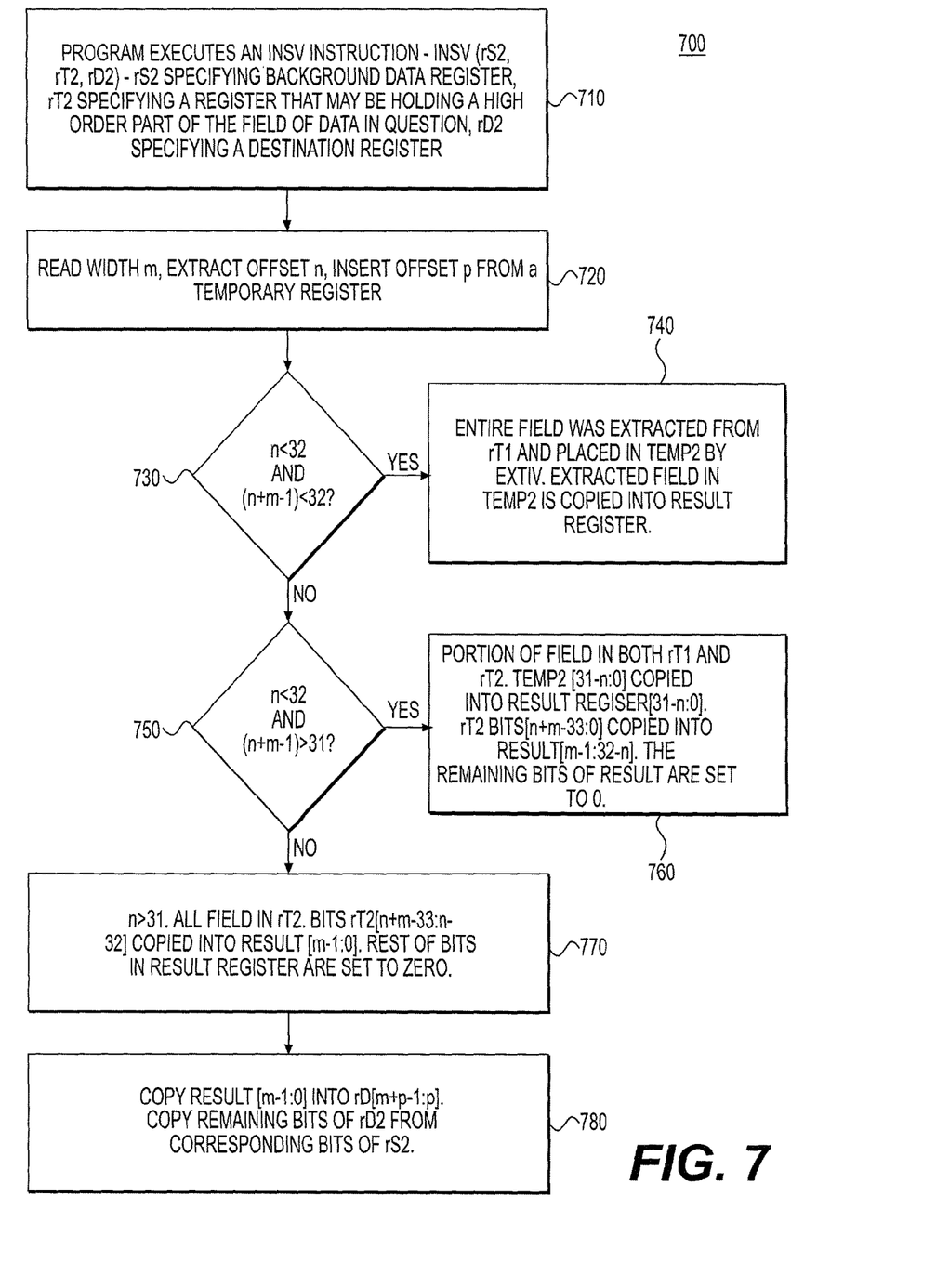
FIG. 7 is a flowchart showing the steps of a method for processing an INSV instruction consistent with methods and systems of the present invention.

FIG. 7 shows the steps of an exemplary method 700 for performing an INSV instruction according to the present invention. A program executes an INSV instruction as shown in FIG. 2b (step 710). The INSV instruction specifies the register holding the high order word that may include the field of interest, the final result register, and a backup data register. The temporary register temp1 holding information on the field and the temporary result register holding data extracted by the EXTIV instruction are both implied. The processor reads information about the field being extracted from a temporary register including its width m, extract offset n, and its insert offset p (step 720). The processor next determines whether the field fits entirely within a low order word based on the extract offset and the width of the field m (step 730). If the extract offset is less than 32 bits and the sum of width of the field and the extraction offset minus 1 is less than 32 bits then the field was completely extracted by the EXTIV instruction. Therefore, the contents of the temporary register temp2 holding the field extracted by the EXTIV instruction is copied into a final result register (step 740).

If the extraction offset is less than 32 bits and the sum of the width of the field and the extraction offset minus 1 is greater than 31 bits (step 750), then the field is contained in both the low order and high order words. The portion of the field extracted in the EXTIV instruction is copied from a temporary register temp2 to a final result register along with the portion of the field in the high order word (step 760). The entire field is then contained in the final result register.

If the extraction offset is greater than 31 bits, then the entire field is contained in the high order word. The field is copied from the register containing the high order word $rT_2$ into the result register and any remaining bits in the result register are set to zero (step 770). No data needs to be copied from the temporary register temp2 because the EXTIV instruction did not extract any part of the field. The contents of the final result register are copied to the destination register $rD_2$ and the remaining bits of $rD_2$ not holding the field, are copied from $rS_2$. Register $rS_2$ holds a copy of data from $rD_2$ so that bits not holding field data may be reinstated.

There are many variations that may be made consistent with the present invention. For example, in another embodiment, the extraction offset is relative to a position of a first field to be extracted. In this case, the extraction offset n refers to the fixed offset value of a field to be extracted relative to a position of a first field to be extracted. For example, if the first field's least significant bit is 60, and a current field to be extracted has a LSB of 40, the difference between these locations, −20, is stored as the extraction offset n for the current field.

Further, while the implementations above use registers being a word in size, systems and methods consistent with the present invention may be used with other sized registers.

The foregoing description is presented for purposes of illustration and description. It is not exhaustive and does not limit the invention to the precise form disclosed. Modifications and variations are possible in light of the above teachings or may be acquired from practicing the invention. The scope of the invention is defined by the claims and their equivalents.

What is claimed is:

1. A processing system for extracting a field from a packet, said system comprising:
   an instruction memory having a pair of instructions;
   a processor having a set of general registers, at least a portion of said packet being stored in a pair of general registers, said processor being configured to
      extract, responsive to a first one of the instructions, any part of said field in a first one of the pair of general registers designated as a first source register, and
      extract, responsive to a second one of the instructions, any part of said field in a second one of the pair of general registers designated as a second source register
      store any extracted part of the field extracted from the first source register in a temporary result register; and
      insert, responsive to the second instruction, any portion of the field extracted from the second one of the general registers, along with any part of the field in the temporary result register, into a final result register.

2. The system of claim 1, said processor being further configured to:
   extract additional fields from the packet;
   insert a value contained in the additional fields in the final result register; and
   access a table lookup unit using the value in the final result register as a key.

3. The system of claim 1, said processor being further configured to:
   parse the packet to determine a packet formal.

4. The system of claim 3, said processor being further configured to:
   determine field information for the field to be extracted based on the packet format, wherein said field information includes a width of the field and an extraction offset indicating a position of the field in the packet.

5. The system of claim 4, said processor being further configured to:
   determine whether the field to be extracted is stored entirely within the first source register.

6. The system of claim 4, said processor being further configured to:
   determine that the field to be extracted is stored entirely within the first source register when an extraction offset is less than n bits and a sum of the extraction offset and the width minus one is less than n bits, where n is a width of the first source register.

7. The system of claim 4, said processor being further configured to:
   determine whether the field to be extracted is partly in the first source register.

8. The system of claim 4, said processor being further configured to:
   determine that the field to be extracted is partly in the first source register when an extraction offset is less than n bits and a sum of the extraction offset and the width minus one is greater than n minus one bits, where n is the width of the first source register.

9. The system of claim 4, said processor being further configured to:
   determine whether the field to be extracted is absent from the source register.

10. The system of claim 4, said processor being further configured to:
    determine that the field to be extracted is absent from the source register when the extraction offset is greater than n minus one bits, where n is the width of the source register.

11. The system of claim 4, said processor being further configured to:
    determine whether the field to be extracted is entirely held in the second source register.

12. The system of claim 4, said processor being further configured to:
    determine that the field to be extracted is entirely held in the second source register when the extraction offset is greater than n minus one bits, where n is the width of the second source register.

13. The system of claim 11, said processor being further configured to:
    extract the field from the second source register and store the result in the final result register when the field to be extracted is entirely held in the second source register.

14. The system of claim 4, said processor being further configured to:
    determine whether the field is partially in the second source register.

15. The system of claim 4, said processor being further configured to:
    determine that the field is partially in the second source register when the extraction offset is less than n bits and the sum of the extract offset and the width minus one is greater than n minus one bits, where n is the width of the second source register.

16. The system of claim 14 wherein the field information includes an insertion offset, said processor being further configured to:
    extract, when the field is partially in the second register, the portion of the field in the second source register and inserting the result, along with the part of the field extracted by the first instruction, into a final result register offset by the insertion offset.

17. The system of claim 4, said processor being further configured to:
    determine whether the field is absent from the second source register.

18. The system of claim 4, said processor being further configured to:
    determine that the field is absent from the second source register when an extraction offset is less than n bits and the sum of the extraction offset and the width minus one is less than n bits, where n is the width of the source register.

19. The system of claim 17, said processor being further configured to:
    copy a field extracted by the first instruction to a final result register when the field is absent from the second source register.

20. A method for extracting a field from a packet comprising:
    storing at least a portion of the packet in a pair of general registers;
    executing a first instruction extracting any part of the field from a first one of the pair of general registers designated as a first source register;
    executing a second instruction extracting any part of the field from a second one of the pair of general registers designated as a second source register; and
    storing any extracted part of the field extracted from the first source register in a temporary result register, wherein said step of executing a second instruction includes the step of inserting any portion of the field extracted from the second one of the general registers, along with any part of the field in the temporary result register, into a final result register.

21. The method of claim 20 further including:
    extracting additional fields from the packet and inserting a value contained in the additional fields in the final result register.

22. The method of claim 21 further including:
    accessing a table lookup unit using the value in the final result register as a key.

23. The method of claim 20 further including:
    parsing the packet to determine a packet format.

24. The method of claim 23 further including:
    determining field information for the field to be extracted based on the packet format, wherein said field information includes a size of the field and an extraction offset indicating a position of the field in the packet.

25. The method of claim 24 wherein executing a first instruction includes:
    determining whether the field to be extracted is stored entirely within the first source register.

26. The method of claim 25 wherein determining further includes:
    determining whether an extraction offset is less than n bits and a sum of the extraction offset and a width minus one is less than n bits, where n is the width of the first source register.

27. The method of claim 24 wherein executing a first instruction includes:
    determining whether the field of interest is partly in the first source register.

28. The method of claim 27 wherein said determining further includes:
    determining whether an extraction offset is less than n bits and a sum of the extraction offset and a width minus one is greater than n minus one bits, where n is the width of the first source register.

29. The method of claim 24 wherein executing a first instruction includes:
    determining whether the field of interest is absent from the source register.

30. The method of claim 29 wherein said determining further includes:
    determining whether the extraction offset is greater than n minus one bits, where n is the width of the source register.

31. The method of claim 24 wherein said executing a second instruction includes:
    determining whether the field to be extracted is entirely held in the second source register.

32. The method of claim 31 wherein said determining includes:
    determining whether the extraction offset is greater than n minus one bits, where n is the width of the second source register.

33. The method of claim 31 further including:
    extracting the field from the second source register; and storing the result in the final result register when the field to be extracted is entirely held in the second source register.

34. The method of claim 24 wherein said executing a second instruction includes:

determining whether the field is partially in the second source register.

35. The method of claim 34 wherein determining includes:
    determining whether the extraction offset is less than n bits and the sum of the extract offset and a width minus one is greater than n minus one bits, where n is the width of the second source register.

36. The method of claim 34 wherein the field information includes an insertion offset, said method further including:
    extracting, when the field is partially in the second register, the portion of the field in the second source register; and
    inserting the result, along with the part of the field extracted by the first instruction, into a final result register offset by the insertion offset.

37. The method of claim 24 wherein executing a second instruction includes:
    determining whether the field is absent from the second source register.

38. The method of claim 37 wherein determining includes:
    determining whether an extraction offset is less than n bits and the sum of the extraction offset and the width minus one is less than n bits, where n is the width of the second source register.

39. The method of claim 37 further including:
    copying a field extracted by the first instruction to a final result register when the field is absent from the second source register.

* * * * *

UNITED STATES PATENT AND TRADEMARK OFFICE
CERTIFICATE OF CORRECTION

PATENT NO. : 7,039,060 B2 Page 1 of 1
APPLICATION NO. : 09/799610
DATED : May 2, 2006
INVENTOR(S) : Katzman et al.

It is certified that error appears in the above-identified patent and that said Letters Patent is hereby corrected as shown below:

Title page (74)
Attorney, Agent, or Firm entry should read:

James W. Huffman

Title page (73)
Assignee Name and Residence should read:

MIPS Technologies, Inc.     Mountain View, CA

Signed and Sealed this

Nineteenth Day of September, 2006

JON W. DUDAS
*Director of the United States Patent and Trademark Office*